United States Patent [19]

Steed

[11] Patent Number: 5,595,587
[45] Date of Patent: Jan. 21, 1997

[54] APPARATUS FOR TREATING AIR WITH ELECTRICALLY CHARGED AND UNCHARGED LIQUID SPRAYS

[76] Inventor: Victor O. Steed, 303 Glen Ashleigh, 237 Oxford Road, Illovo, Johannesburg, South Africa

[21] Appl. No.: 616,890

[22] Filed: Mar. 18, 1996

Related U.S. Application Data

[62] Division of Ser. No. 274,741, Jul. 14, 1994, Pat. No. 5,518,525.

[30] Foreign Application Priority Data

Jul. 14, 1993 [ZA] South Africa ............................ 93/5081

[51] Int. Cl.$^6$ ................................................... B03C 3/014
[52] U.S. Cl. ............................ 96/27; 96/53; 96/63; 96/74
[58] Field of Search ..................................... 95/58, 64, 65, 95/71, 78; 96/52, 53, 27, 61, 74, 63

[56] References Cited

U.S. PATENT DOCUMENTS

| | | | |
|---|---|---|---|
| 2,864,458 | 12/1958 | De Graaf et al. ............................. | 96/27 |
| 3,016,979 | 1/1962 | Schmid ..................................... | 96/27 X |
| 3,503,704 | 3/1970 | Marks ....................................... | 95/58 X |
| 4,070,424 | 1/1978 | Olson et al. ............................. | 96/52 X |
| 5,300,270 | 4/1994 | Krigmont et al. ....................... | 95/58 X |
| 5,310,416 | 5/1994 | Borger et al. ............................. | 95/64 |
| 5,427,608 | 6/1995 | Aver et al. ................................ | 95/65 |

FOREIGN PATENT DOCUMENTS

| | | |
|---|---|---|
| 59-1582 | 4/1959 | South Africa . |
| 87-2184 | 3/1987 | South Africa . |
| 2260278 | 4/1993 | United Kingdom ....................... 96/52 |

Primary Examiner—Richard L. Chiesa
Attorney, Agent, or Firm—Burns, Doane, Swecker & Mathis, L.L.P.

[57] ABSTRACT

Apparatus for treating gas or vapor includes an impeller arranged in a conduit which draws dusty or fume-laden air through the duct. One or more nozzles are arranged to spray fine droplets of water onto the impeller. Downstream of the impeller, a set of angled collection plates collect the fine water droplets emitted by the nozzle, together with dust or fumes collected by the droplets. The nozzle is connected to a high voltage source, so that the droplets emitted by the nozzle are electrostatically charged. This causes them to attract dust particles and other contaminants. The collection plates are earthed, so that the charged droplets are attracted to them, improving the effectiveness of the apparatus.

7 Claims, 1 Drawing Sheet

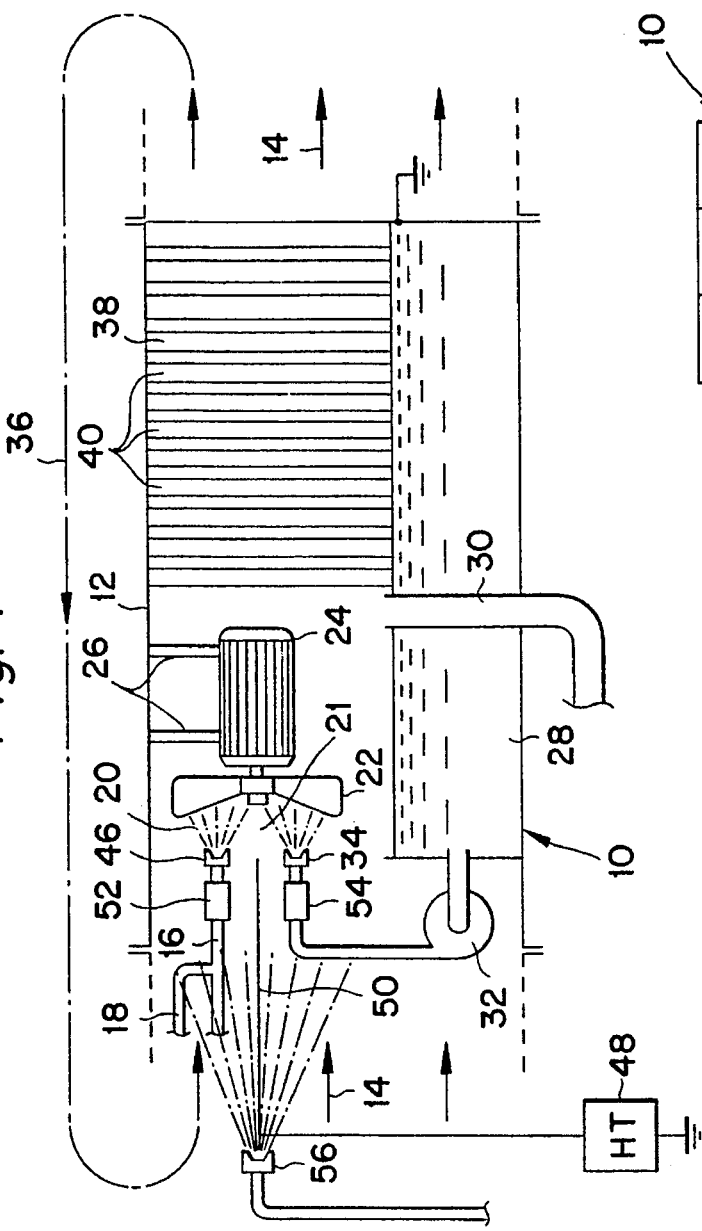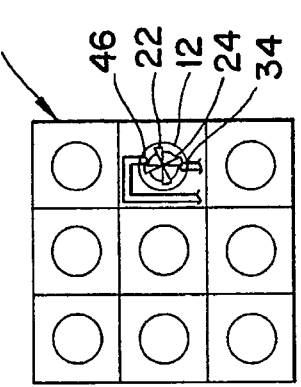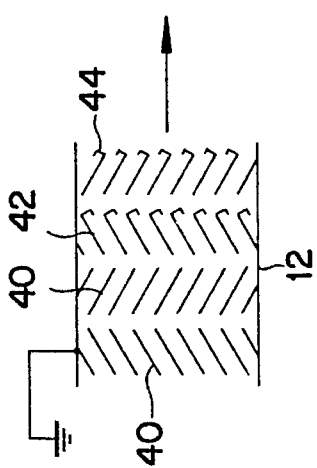

APPARATUS FOR TREATING AIR WITH ELECTRICALLY CHARGED AND UNCHARGED LIQUID SPRAYS

This application is a divisional of application Ser. No. 08/274,741, filed Jul. 14, 1994, now U.S. Pat. No. 5,518, 525.

BACKGROUND OF THE INVENTION

This invention relates to a method and apparatus for treating a gas or vapor. In particular, the method and apparatus have application in controlling dust in air used for ventilation.

SUMMARY OF THE INVENTION

According to the invention there is provided a method of treating gas or vapor comprising the steps of:

conducting gas or vapor through a conduit;

atomising a liquid to create a spray of fine droplets of the liquid;

electrostatically charging the droplets; and directing the spray into the conduit to cause dispersion of the droplets through the gas or vapor, so that dust particles or other predetermined components in the gas or vapor are attracted to the droplets.

The method may be applied to the extraction of dust and fumes from ventilation air, in which case the dispersion of the liquid through contaminated air causes the liquid droplets to collect dust, fumes, or particulate matter in the air.

The droplets may be charged by applying a high voltage to a nozzle from which the droplets are discharged.

The method may include conducting the gas or vapor in the conduit past a plurality of collector plates which are maintained at a different potential from that applied to the droplets, so that the droplets are attracted to the collector plates.

The method may include the steps of providing a rotating surface in the conduit, and directing the spray at the rotating surface.

The method may include directing an auxiliary spray of fine droplets over an entrance opening of the conduit, thereby to prevent ignition of explosive gas or particles outside the conduit.

The fine droplets are preferably less than 1 mm in diameter.

Further according to the invention apparatus for treating a gas or vapor comprises:

a conduit arranged to conduct gas or vapor therethrough;

at least one nozzle arranged to be supplied with liquid under pressure and to emit a spray of fine droplets of the liquid into the conduit, thereby to cause dispersion of the droplets through the gas or vapor in the conduit; and a high voltage source connected to the at least one nozzle for electrostatically charging the droplets which are emitted therefrom.

The at least one nozzle may be connected to a source of liquid under pressure by a pipe having an electrically insulating portion between the nozzle and the source.

The high voltage source may be a DC source with an output voltage in the range 5 to 50 kV, preferably about 20 kV.

The nozzle may be connected via a first pipe to a source of a liquid such as water, with a second pipe for compressed gas connected to the nozzle so that application of the liquid and the compressed gas simultaneously causes a spray of atomised droplets of the liquid to be emitted from the nozzle, the nozzle being electrically insulated from both the first and second pipes.

An impeller may be disposed within the conduit for conducting the gas or vapor therethrough.

Preferably, a plurality of collector plates are disposed downstream of the nozzle in the conduit, the plates being maintained at a different potential from that applied to the nozzle so that the droplets are attracted to the collector plates.

An auxiliary nozzle may be arranged to direct an auxiliary spray of fine droplets over an entrance opening of the conduit, thereby to prevent ignition of explosive gas or particles outside the conduit.

BRIEF DESCRIPTION OF THE DRAWINGS

The invention will now be described in more detail by way of example only with reference to the accompanying drawings, in which:

FIG. 1 shows a schematic side view of an air treatment apparatus according to the invention;

FIG. 2 shows a sectional plan view of part of the apparatus shown in FIG. 1; and FIG. 3 is a schematic end view of an alternative embodiment of the apparatus.

DESCRIPTION OF PREFERRED EMBODIMENTS

Dust extraction apparatus according to the invention is shown generally at 10 in FIG. 1. The apparatus comprises a conduit in the form of a section of ducting 12. Air is caused to pass through the ducting in the direction of arrows 14. The air may be hot or cold, and may contain dust, gas or vapor. The ducting 12 houses heat exchange apparatus which can be operated to transfer heat from the air passing through the conduit to a source of liquid, about which more is said below.

In some applications, the ducting may be dispensed with, and the conduit may simply comprise a tunnel or the like, for example in a mine working.

At the upstream end of the ducting 12 a source of liquid (usually water) is connected to an inlet pipe 16, which terminates in a nozzle 46. Associated with the inlet pipe 16 is a compressed air line 18. The line 18 may carry compressed air, gas or steam which breaks the inlet liquid carried by the pipe 16 into a spray 20 of fine droplets. The nozzle 46 is designed so that the droplets have a mean diameter of less than 1 mm. The small size of the droplets increases the available surface area of liquid for heat exchange and dust extraction applications.

The spray 20 is directed onto an impeller 22 which is driven rotatably by a motor 24. The impeller is arranged transversely across the duct, and the outer edges of the impeller blades are parallel to the walls of the duct. The inner corners of the blades nearest the source of the spray 20 are cut off diagonally to define a conically shaped recess 21 into which the spray 20 is directed. The motor 24 is suspended inside the duct 12 by brackets 26. The motor can be an electric, pneumatic or hydraulic motor, for example.

It will be appreciated that the described motor and impeller configuration is entirely exemplary, and that numerous variations are possible. For example, in some dust extraction and chemical processes it may be preferable for the duct 12 to be vertical, with the motor attached in a vertical position.

A sump 28 is provided at the bottom of the ducting 12 and has an overflow pipe 30. A high pressure pump 32 draws water from the sump and directs it to a delivery nozzle 34. The nozzle 34 is arranged to direct liquid into the conically shaped recess 21 at the centre of the impeller. The high pressure pump 32 and nozzle 34 recirculate the liquid from the sump to allow repeated heat exchange passes between the liquid in the sump and the air 14 being drawn through the ducting.

Means may also be provided for recirculating some of the air, gas and/or vapor passing through the ducting 12 so that repeated extraction and/or heat exchange passes may occur. The recirculation of this air, gas or vapor is shown schematically by the dotted line 36 at the top of FIG. 1. The recirculation may occur through an adjacent mine shaft, stope, or working area, for example.

At the downstream end of the ducting 12, liquid collecting means 38 are provided. These means comprise a series of spray eliminator plates 40 which act as heat exchange surfaces and collect droplets of liquid inside the ducting 12. The droplets of liquid which accumulate on the spray eliminator plates run down by gravity to fall back into the sump 28. If the apparatus is used in an air cooling application, the evaporation of the falling droplets supplements the cooling of the air. The orientation of the spray eliminator plates can be seen more clearly in the sectional plan view of FIG. 2. It will be seen in this figure that the plates are arranged at an oblique angle relative to the longitudinal axis of the ducting 12. The plates are arranged in sets, with alternate sets having their plates arranged at approximately 90° to each other. Plates 42 near the exit of the liquid collecting means are provided with lips 44 to catch any droplets which might otherwise escape, which would reduce the heat transfer efficiency of the apparatus.

In order to improve the dust and fume extraction capabilities of the apparatus, a high voltage DC source 48 is provided, which generates a high output voltage in the region of 5 to 50 kV, typically 20 kV. This output is connected via an insulated conductor 50 to both spray nozzles 34 and 46, as shown schematically in FIG. 1. The nozzles are metallic, so that they impart the high voltage from the source 48 to the droplets emitted in use, charging them electrostatically. In the case where metallic pipes feed the nozzles, tubular insulating spacers 52 and 54 of a plastics material having a suitably high dielectric co-efficient are provided to interrupt the pipes, which otherwise would earth the nozzles.

In a prototype installation, a high voltage source similar to a conventional electric fence energiser was utilised.

The spray eliminator plates 40 are connected to the same earth as the high voltage supply 48, so that the electrostatically charged water droplets, with their burden of dust particles or fumes, tend to be attracted towards the plates for collection. The electrostatic charge on the droplets causes them to attract fine particles as they move towards the plates, so that the effectiveness of the apparatus is significantly increased.

As mentioned above, the apparatus 10 of the invention may be used in a heat exchange application. In this case, the source of liquid being introduced into the ducting by inlet pipes 16 is provided at a temperature towards which the air is to be brought. In particular, the illustrated apparatus may be used in a heat exchange process for heat rejection from an underground refrigeration plant in a mine. Here, the inlet pipe 16 would carry high temperature cooling water from the refrigeration plant to lose heat to relatively cooler return or reject ventilation air 14 in the duct 12. The spray of fine droplets provided by the compressed air line 18 would be used to create a mist of fine droplets to increase the surface area of liquid available for heat exchange and improve the removal of heat, dust and fumes, typically diesel and blasting fumes. If the illustrated apparatus were to be used in mine stopes or development ends in an underground mining operation, the duct 12 (or simply a tunnel) would be carrying relatively warm or hot ventilation air which would be cooled by cold service water fed in through the inlet pipe 16. Once again, the compressed air fed in through the line 18 would be used to create a mist of fine droplets to improve heat exchange and the removal of heat, dust and fumes.

In order to prevent possible ignition of explosive gases or dust by the high voltage circuit of the apparatus, an auxiliary wide-angle spray nozzle 56 is located at the entrance of the ducting 12, and creates a fine mist of water between the exterior and the interior thereof.

The heat exchange, and dust and fume removal apparatus described above can be used in various applications. Valuable dusts containing platinum or gold may be collected at processing plants and assay offices by the apparatus of the invention. In a similar way, dangerous silica, coal or asbestos dust at crushers may be removed. (Collected damp dust is usually safer for disposal than dry dust). The liquid sprays of the apparatus can also be used to keep the gases or vapours below their ignition temperatures, enabling potentially explosive gases such as methane or vapors such as ether vapors to be safely extracted. The apparatus can also be used to add or remove chemicals into a gas flow during a manufacturing process.

FIG. 3 shows in a highly simplified schematic form an embodiment of the apparatus in which a conduit is divided into a number of subconduits, each with its own section of ducting 12, with an associated impeller 22 and spray nozzles 34 and 46. The sets of nozzles 34 and 46 can be connected to respective common sources of liquid under pressure. The use of a multi-conduit arrangement allows a plurality of standard-sized units according to the invention to be provided, instead of requiring different-sized units for different applications.

The described invention occupies a relatively small volumetric space, has a high heat transfer and dust collecting capacity, and may be retrofitted into an existing ducting line.

I claim:

1. Apparatus for treating a gas or vapor comprising:

a conduit arranged to conduct gas or vapor therethrough;

at least one main nozzle arranged to be supplied with liquid under pressure and to emit a spray of fine droplets of the liquid into the conduit, thereby to cause dispersion of the droplets through the gas or vapor in the conduit;

a high voltage source connected to the at least one main nozzle for electrostatically charging the droplets which are emitted therefrom; and an auxiliary nozzle arranged to direct an auxiliary spray of fine uncharged droplets over an entrance opening of the conduit, thereby to prevent ignition of explosive gas or particles outside the conduit.

2. Apparatus according to claim 1 wherein the at least one main nozzle is connected to a source of liquid under pressure by a pipe having an electrically insulating portion between the nozzle and the source.

3. Apparatus according to claim 1 wherein the high voltage source is a DC source with an output voltage in the range 5 to 50 kV.

4. Apparatus according to claim 3 wherein the output voltage is approximately 20 kV.

5. Apparatus according to claim 2 wherein the at least one main nozzle is connected via a first pipe to a source of a liquid, with a second pipe for compressed gas connected to the at least one main nozzle so that application of the liquid and the compressed gas simultaneously causes a spray of atomized droplets of the liquid to be emitted from the at least one main nozzle, the at least one main nozzle being electrically insulated from both the first and second pipes.

6. Apparatus according to claim 1 wherein an impeller is disposed within the conduit for conducting the gas or vapor therethrough.

7. Apparatus according to claim 1 wherein a plurality of collector plates are disposed downstream of the at least one main nozzle in the conduit, the plates being maintained at a different potential from that applied to the at least one main nozzle so that the droplets are attracted to the collector plates.

* * * * *